United States Patent
Gai et al.

(10) Patent No.: US 9,726,912 B2
(45) Date of Patent: Aug. 8, 2017

(54) BACKLIGHT ASSEMBLY AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Xin Gai, Beijing (CN); Ning Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 26 days.

(21) Appl. No.: 14/498,277

(22) Filed: Sep. 26, 2014

(65) Prior Publication Data

US 2015/0338686 A1 Nov. 26, 2015

(30) Foreign Application Priority Data

May 26, 2014 (CN) .......................... 2014 1 0225261

(51) Int. Cl.
 G02F 1/01 (2006.01)
 G02F 1/1335 (2006.01)
(52) U.S. Cl.
 CPC ...... *G02F 1/0102* (2013.01); *G02F 1/133606* (2013.01); *G02F 1/133608* (2013.01); *G02F 2201/465* (2013.01)
(58) Field of Classification Search
 CPC ............. G02F 1/0102; G02F 1/133606; G02F 1/133608; G02B 6/0088
 See application file for complete search history.

(56) References Cited

U.S. PATENT DOCUMENTS 6,175,396 B1 * 1/2001 Kim .................. G02F 1/133308
 349/58
6,773,127 B2 * 8/2004 Kao ..................... G02B 6/0088
 362/23.15

(Continued)

*Primary Examiner* — Andrew Coughlin
*Assistant Examiner* — Zachary J Snyder
(74) *Attorney, Agent, or Firm* — Kinney & Lange, P.A.

(57) ABSTRACT

Disclosed are a backlight assembly and a display apparatus comprising the backlight assembly. The backlight assembly comprising: a film member; and a support frame holding the film member; the support frame comprising at least one support plate; the support plate is provided with a stepped notch including a first notch and a second notch extending from the first notch and open to an edge of the support plate and having a width smaller than the first notch; the film member is provided with a protrusion for engaging with the stepped notch, the protrusion including a first part projecting from the film member and a second part extending from the first part and having a width larger than the first part; wherein the width of the second part of the protrusion is larger than that of the first notch of the stepped notch, and the width of the second notch of the stepped notch is smaller than that of the first part of the protrusion, such that when the protrusion is engaged with the stepped notch, the first part of the protrusion engages the first notch of the stepped notch, with the second part of the protrusion positioned outside the support plate for restraining the film member in an extending direction of the film member; and the second notch of the stepped notch is positioned over the first part of the protrusion for restraining the film member in a height direction of the support plate. The backlight assembly with the above structure can prevent the film member from dropping off the support plate.

6 Claims, 3 Drawing Sheets

(56) References Cited

U.S. PATENT DOCUMENTS

| | | | | |
|---|---|---|---|---|
| 7,197,227 B2* | 3/2007 | Fan | ............... | G03B 21/64 |
| | | | | 349/58 |
| 7,626,747 B2* | 12/2009 | Murakata | ............ | G02B 6/0088 |
| | | | | 349/58 |
| 7,901,126 B2* | 3/2011 | Jeong | ............... | G02B 6/0088 |
| | | | | 362/632 |
| 7,905,619 B2* | 3/2011 | Iwamoto | ............ | G02F 1/133606 |
| | | | | 362/632 |
| 8,172,418 B2* | 5/2012 | Huang | ............. | G02F 1/133606 |
| | | | | 362/633 |
| 2006/0007367 A1* | 1/2006 | Cho | ............... | G02F 1/133308 |
| | | | | 349/58 |
| 2007/0014078 A1* | 1/2007 | Cheng | ............. | G02B 6/0088 |
| | | | | 361/600 |
| 2009/0180049 A1* | 7/2009 | Lee | ............... | G09F 9/35 |
| | | | | 349/58 |
| 2010/0289979 A1* | 11/2010 | Lee | ............... | G02F 1/133308 |
| | | | | 349/58 |
| 2013/0235295 A1* | 9/2013 | Tang | ............... | G02F 1/133608 |
| | | | | 349/58 |

\* cited by examiner

BACKLIGHT ASSEMBLY AND DISPLAY APPARATUS

CROSS-REFERENCE TO RELATED APPLICATION

This application claims the benefit of Chinese Patent Application No. 201410225261.3 filed on May 26, 2014 in the State Intellectual Property Office of China, the whole disclosure of which is incorporated herein by reference.

BACKGROUND OF THE INVENTION

Technical Field

Embodiments of the present invention relate to the field of display technology, and in particular, to a backlight assembly and a display apparatus using the backlight assembly.

Description of the Related Art

In a conventional backlight source of medium or small size, typically, a film member is secured to a support plate by providing at least a pair of protrusion and notch between the film member and the support plate and engaging the protrusion and the notch with each other. FIG. 1 shows a partial structural view of a backlight assembly in the prior art. As shown in FIG. 1, a film member positioning notch 011 is formed in a film member 01, and a support plate positioning protrusion 021 is formed on a support plate 02; alternatively, as shown in FIG. 2, which shows a partial structural view of another backlight assembly in the prior art, a film member positioning protrusion 012 is formed on a film member 01, and a support plate positioning notch 022 is formed in a support plate 02.

However, with the structure mentioned above, the positioning notch and the corresponding positioning protrusion of the film member and the support plate match each other just right without sufficient gap left between the positioning protrusion and the positioning notch. In this case, when performing temperature and humidity test on the backlight assembly in a later process, the expansion and retraction of the film member will be restricted resulting in wrinkles in the film member. Further, in the structures mentioned above, the connection between the film member and the support plate are not firm. Therefore, when performing vibration test on the backlight assembly later, the film member tends to drop off the support plate, thus, scratches may be formed on the support plate, or the film member may be pressed by a glue frame in the backlight assembly.

SUMMARY OF THE INVENTION

Embodiments of the present invention provide a backlight assembly capable of preventing a film member from dropping off the support plate.

According to an embodiment of the present invention, there is provided a backlight assembly comprising:

a film member; and
a support frame holding the film member,
wherein
the support frame comprising at least one support plate, wherein the support plate is provided with a stepped notch including a first notch and a second notch extending from the first notch and open to an edge of the support plate and having a width smaller than the first notch;

the film member is provided with a protrusion for locking with the stepped notch, the protrusion including a first part projecting from the film member, and a second part extending from the first part and having a width larger than the first part;

the width of the second part of the protrusion is larger than that of the first notch of the stepped notch, and the width of the second notch of the stepped notch is smaller than that of the first part of the protrusion, such that when the protrusion is locked with the stepped notch, the first part of the protrusion engages the first notch of the stepped notch, the second part of the protrusion is positioned outside the support plate for restraining the film member in an extending direction of the film member; and the second notch of the stepped notch is positioned over the first part of the protrusion for restraining the film member in a height direction of the support plate.

Embodiments of another aspect of the present invention provide a display apparatus comprising the above backlight assembly.

BRIEF DESCRIPTION OF THE DRAWINGS

The above and other features of the invention will become more apparent by describing in detail an exemplary embodiment thereof with reference to the accompanying drawings.

Figure 1:
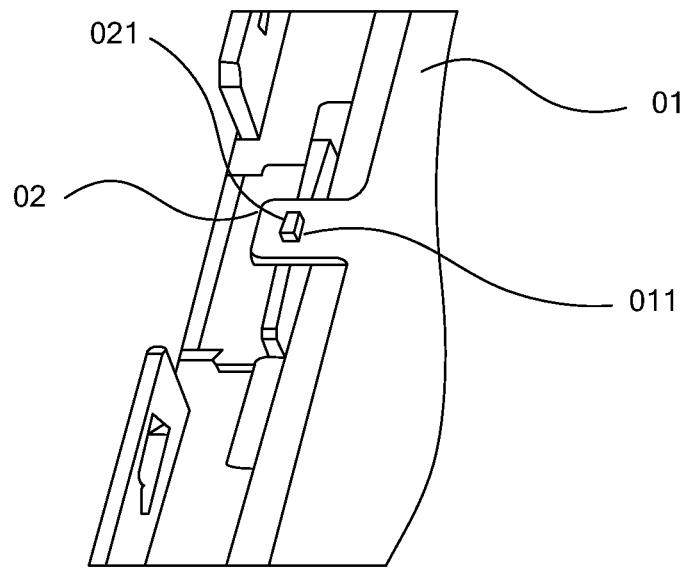
FIG. 1 is a partial schematic structural view showing a backlight assembly in the prior art.
Figure 2:
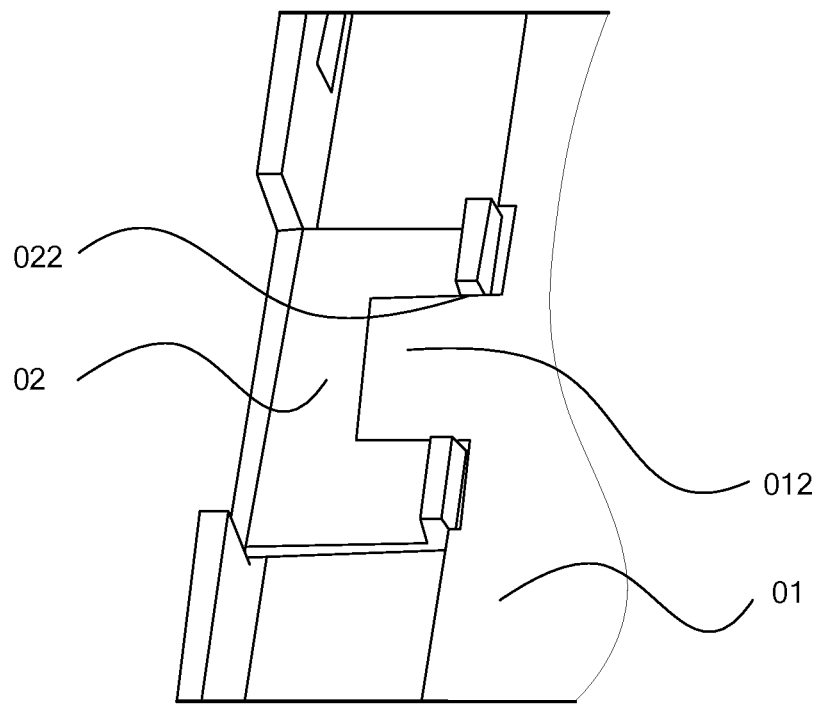
FIG. 2 is a partial schematic structural view showing another backlight assembly in the prior art.

| Reference numerals: | |
|---|---|
| 01-film member; | 011-film member positioning notch; |
| 012-film member positioning protrusion | 02-support plate |
| 021-support plate positioning protrusion | 022-support plate positioning notch |
| 1-support frame | 11-side plate |
| 2-film member | 21-protrusion |
| 211-first part | 2111-slit |
| 212-second part | 3-stepped notch |
| 31-second notch | 32-first notch |

DETAILED DESCRIPTION OF PREFERRED EMBODIMENTS OF THE INVENTION

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thoroughly and completely understood.

Figure 3:
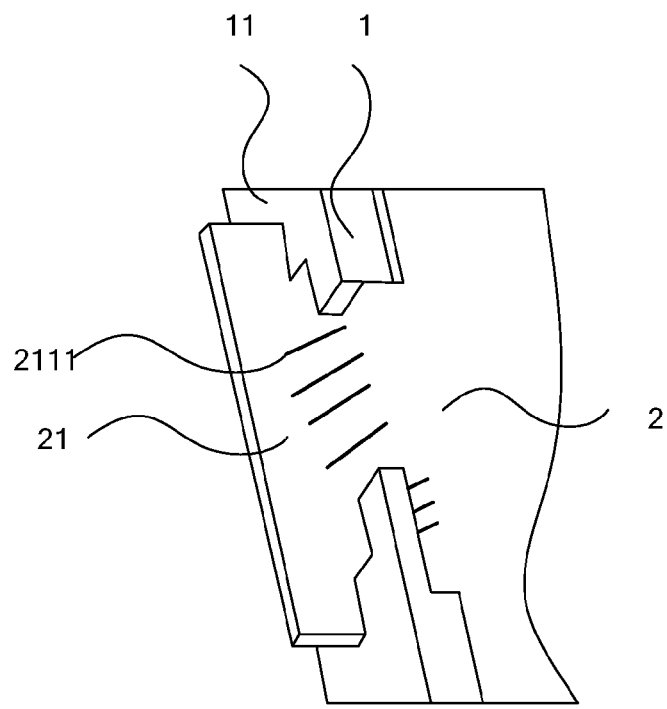
FIG. 3 is a partial schematic structural view showing a backlight assembly according to an embodiment of the present invention.

FIG. 3 is a partial structural view showing a backlight assembly according to an exemplary embodiment of the present invention. As shown in FIG. 3, the backlight assembly comprises a film member 2 and a support frame 1. The support frame 1 comprises a bottom plate (not shown) and four side plates 11 (just shown one). The bottom plate and the four side plates define a recess for receiving the film member. At least one side plate 11 is formed with a stepped notch 3 (referring to FIG. 4).

Figure 4:
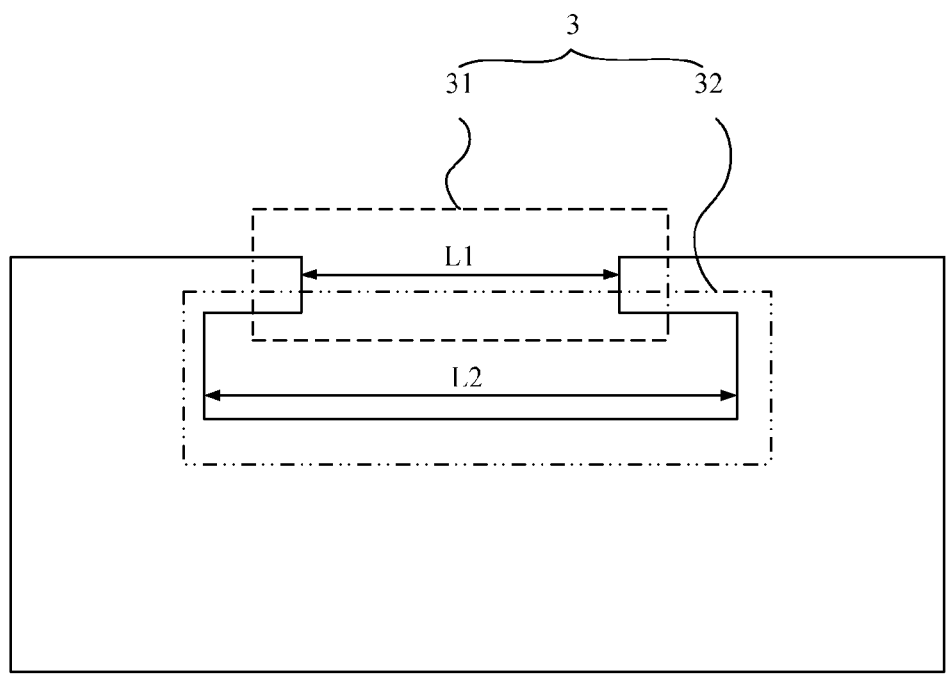
FIG. 4 is a schematic structural view showing a stepped notch formed in a side plate in the backlight assembly of FIG. 3.

FIG. 4 is a schematic structural view of the stepped notch 3 formed in the side plate 11 of the backlight assembly shown in FIG. 3. The stepped notch 3 includes a first notch 32 for engaging the film member and a second notch 31 for restraining the film member in a height direction of the side plate 11. The width L2 of the first notch 32 is larger than the width L1 of the second notch 31. The second notch 31 extends from the first notch 32 to an edge of the side plate 11. In other words, the second notch 31 opens to the edge of the side plate 11.

Figure 5:
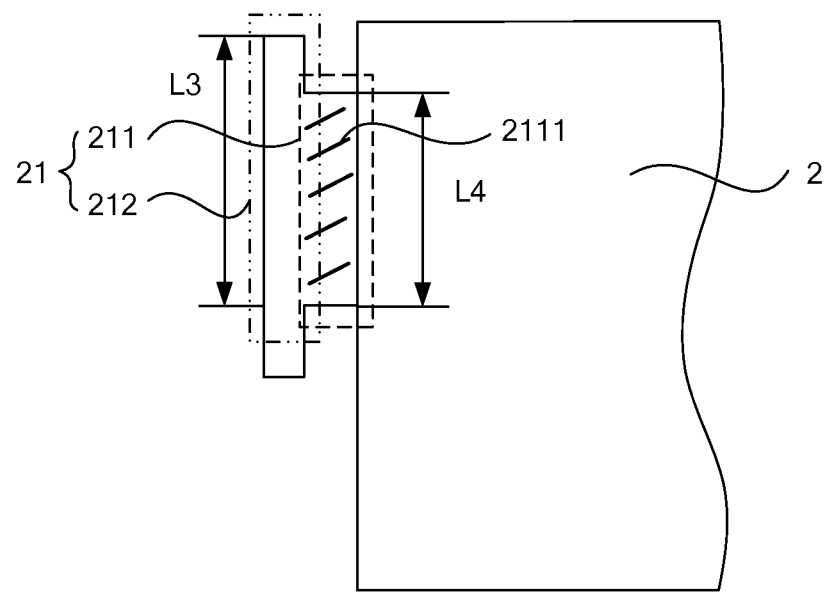
FIG. 5 is a schematic structural view of the film member in the backlight assembly of FIG. 3.

FIG. 5 is a schematic structural view of the film member 2 of the backlight assembly shown in FIG. 3. As shown in FIG. 5, the film member 2 is provided with a protrusion 21 for matching the stepped notch 3. The protrusion 21 includes a first part 211 for engaging with the first notch 32 of the stepped notch 3 and a second part 212 for restraining the film member 2 in an extending direction of the film member 2. The width L3 of the second part 212 is larger than the width L4 of the first part 211, and is larger than the width L2 of the first notch 32 of the stepped notch 3. The width L4 of the first part 211 of the protrusion 21 may be substantially equal to the width L2 of the first notch 32 of the stepped notch 3.

When assembling the backlight assembly of FIG. 3, an operator can place the film member 2 such that the protrusion 21 of the film member 2 is at an a certain angle with respect to the stepped notch 3; then pass the first part 211 of the protrusion 21 inclindedly through the second notch 31 of the stepped notch 3 formed in the side plate 11 until the first part 211 is put inside the first notch 32. As shown in FIG. 3, when the protrusion 21 is locked with the stepped notch 3, the first part 211 of the protrusion 21 is engaged with the first notch 32 of the stepped notch 3, while the second part 212 of the protrusion 21 is positioned outside the side plate 11 for restraining the film member 2 in the extending direction of the film member 2 so as to prevent the film member 2 from moving in the extending direction of the film member 2; at the same time, the second notch 31 of the stepped notch 3 is positioned over the first part 211 of the protrusion 21 for restraining the film member 2 in the height direction of the side plate 11 so as to prevent the film member 2 from dropping off the support frame 1 during the vibration test.

As shown in FIG. 3, the first part 211 of the protrusion 21 may be formed with a plurality of slits 2111 distributed along the width thereof and penetrating through the thickness thereof. When assembling the backlight assembly in FIG. 3, an operator may grip the protrusion 21 of the film member 2. Because the first part 211 of the protrusion 21 is formed with a plurality of slits 2111, the first part 211 of the protrusion 21 can be flexed and thus the width of the first part 211 may be reduced such that the protrusion 21 can pass through the second notch 31 of the stepped notch 3 formed in the side plate 11 and enter the first notch 32; then when the operator releases the protrusion 21, the first part 211 of the protrusion 21 will restore to its original width and engage with the first notch 32 of the stepped notch 3. In this way, the stepped notch 3 of the side plate 11 is locked with the protrusion 21, as shown in FIG. 3.

Because the first part 211 of the protrusion 21 is provided with the slits 2111, when the backlight assembly is experienced temperature and humidity test, the first part 211 of the protrusion 21 of the film member 2 can expand and retract freely within the first notch 32 of the stepped notch 3, thus the wrinkle in the film member 2 can be reduced; further, it is not necessary to leave a gap in advance between the first part 211 of the protrusion 21 and the first notch 32 of the stepped notch 3 so that the stability of the connection between the film member 2 and the side plate 11 can be improved.

It is to be noted that, to facilitate the mounting of the film member 2 on the side plate 11, the width of the second notch 31 of the stepped notch 3 is slightly smaller than that of the first notch 32. That is, the width of the second notch 31 of the stepped notch 3 is slightly smaller than that of the first part 211 of the protrusion 21. A person skilled in the art may set the difference of width between the first notch and the second notch of the stepped notch as desired. The number of the slits in the first part of the protrusion of the film member may be set by a person skilled in the art according to experience.

In order to improve the stability of connection between the film member 2 and the support frame 1, according to an embodiment, the four side plates 11 each are provided with a stepped notch 3; and the film member 2 is provided with four corresponding protrusions 21 at four sides of the film member 2 respectively. Because there are four stepped notches and protrusions for restraining four sides of the film member, the film member can be reliably prevented from dropping off the support frame.

According to other embodiments, each side plate 11 may be provided with one stepped notch or more stepped notch so that the connection between the film member and the support plate are more reliable.

According to the above embodiments, the stepped notch 3 is formed in the side plate of the support frame 1. The stepped notch 3 may be formed in the side plate while making the support frame 1.

According to another embodiment, a boss may be provided on an inner side of the side plate 11, and a mounting plate may be provided on the boss. Then a stepped notch may be formed in the mounting plate. In this case, the protrusion of the film member is locked with the stepped notch in the mounting plate. The boss, the mounting plate and the stepped notch may be provided for each side plate 11. The material for the mounting plate and the support frame may be the same.

Alternatively, a support plate separate from the support frame 1 may be provided and a stepped notch may be formed in the support plate; then the support plate is connected to the inner side of the side plate 11 of the support frame 1. Similarly, the protrusion of the film member and the stepped notch in the support plate are engaged with each other. One or more support plates may be provided.

Further, the specific structure of the support frame is not limited to those described in the embodiments. The specific structure of the support frame is not limited as long as there is a support plate for holding the film member.

According to embodiments of the present invention, the film member in the backlight assembly may be a luminance enhancement film, a light diffusion plate, a prism film and the like.

According to an embodiment of another aspect of the present invention, a display apparatus is provided, including the backlight assembly as described above.

With the backlight assembly of the present invention, the wrinkles in the film member are reduced and the film member is prevented from dropping off the support frame and thus the display apparatus can be displayed normally.

Although several exemplary embodiments have been shown and described, it would be appreciated by those skilled in the art that various changes or modifications may be made in these an embodiment without departing from the principles and spirit of the disclosure, the scope of which is defined in the claims and their equivalents.

What is claimed is:

1. A backlight assembly, comprising:
a film member; and
a support frame holding the film member,
wherein:
the support frame comprises at least one support plate, the at least one support plate being formed with a stepped notch, the stepped notch including a first notch, and a second notch extending from the first notch and open to an edge of the support plate, the second notch having a width smaller than that of the first notch;
the film member is provided with a protrusion for locking with the stepped notch, the protrusion including a first part projecting from the film member and a second part extending from the first part and having a width larger than that of the first part;
the width of the second part of the protrusion is larger than that of the first notch of the stepped notch, and the width of the second notch of the stepped notch is smaller than that of the first part of the protrusion, such that when the protrusion is locked with the stepped notch, the first part of the protrusion engages the first notch of the stepped notch, the second part of the protrusion is positioned outside the support plate and engages an outer side of the support plate for restraining the film member in an extending direction of the film member, and the second notch of the stepped notch is positioned over the first part of the protrusion for restraining the film member in a height direction of the support plate; and
an outer side of the second part of the protrusion along the width thereof is located closer to a corresponding outer side of the film member along the width thereof than a corresponding outer side of the first part of the protrusion along the width thereof.

2. The backlight assembly according to claim 1, wherein the support frame comprises a bottom plate and four side plates, the bottom plate and the four side plates surrounding and defining a recess for receiving the film member, and at least one of the side plates serves as the support plate.

3. The backlight assembly according to claim 2, wherein the four side plates each are formed with the stepped notches, and the film member is provided with four protrusions corresponding to the stepped notches in the four side plates respectively.

4. The backlight assembly according to claim 2, wherein the support frame comprises a bottom plate and four side plates, the bottom plate and the four side plates surrounding and defining a recess for receiving the film member, and the support plate is a separate member connected on an inner side of at least one of the four side plates.

5. A display apparatus, comprising the backlight assembly according to claim 2.

6. A display apparatus, comprising the backlight assembly according to claim 1.

* * * * *